(12) United States Patent
Kaltenbach

(10) Patent No.: US 8,109,856 B2
(45) Date of Patent: Feb. 7, 2012

(54) METHOD FOR OPERATING A DRIVE TRAIN OF A VEHICLE DURING TRAILING THROTTLE OPERATION

(75) Inventor: Johannes Kaltenbach, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 378 days.

(21) Appl. No.: 12/522,803

(22) PCT Filed: Jan. 8, 2008

(86) PCT No.: PCT/EP2008/050107
§ 371 (c)(1),
(2), (4) Date: Jul. 10, 2009

(87) PCT Pub. No.: WO2008/098801
PCT Pub. Date: Aug. 21, 2008

(65) Prior Publication Data
US 2010/0216596 A1    Aug. 26, 2010

(30) Foreign Application Priority Data
Feb. 17, 2007  (DE) .......................... 10 2007 008 086

(51) Int. Cl.
*B60W 10/02* (2006.01)
*B60W 10/04* (2006.01)
(52) U.S. Cl. ........................ 477/5; 180/65.285
(58) Field of Classification Search .................. 477/3, 5; 180/65.245, 65.265, 65.28, 65.285
See application file for complete search history.

(56) References Cited

U.S. PATENT DOCUMENTS

| | | | |
|---|---|---|---|
| 5,168,975 A | 12/1992 | Bernhardt et al. | |
| 6,192,847 B1 | 2/2001 | Davis | |
| 7,240,751 B2* | 7/2007 | Hoare et al. | 180/65.25 |
| 7,472,769 B2* | 1/2009 | Yamanaka et al. | 180/65.25 |
| 7,762,922 B2* | 7/2010 | Dreibholz et al. | 477/5 |
| 2007/0080005 A1* | 4/2007 | Joe | 180/65.2 |

(Continued)

FOREIGN PATENT DOCUMENTS

DE    41 34 268 A1    4/1992

(Continued)

OTHER PUBLICATIONS

Ming L. Kuang: "An Investigation of Engine Start-Stop NVH in a Power Split Powertrain Hybrid Electric Vehicle", Advanced Hybrid Vehicle Powertrains 2006, Bd. 2006-01-1500, Apr. 6, 2006, SAE Technical Paper Series.

*Primary Examiner* — Roger Pang
(74) *Attorney, Agent, or Firm* — David & Bujold, P.L.L.C.

(57) ABSTRACT

A method for operating a vehicle drive train during a coasting operation. The drive train has an internal combustion engine, an electric machine, a transmission, and a shift element, with a variable transmission capacity, located between the electric machine and a drive wheels. The electric machine is located in the flow of power between the combustion engine and the transmission. The output torque to be delivered to the wheel is a function of the delivery capacity of the shift element which is adjusted in a controlled manner. During the process of shutting down the combustion engine, the speed of the electric machine is adjusted while maintaining at least a partial engagement of the shift element and the speed of the combustion engine is reduced to zero with the electric machine.

11 Claims, 2 Drawing Sheets

U.S. PATENT DOCUMENTS

| | | | |
|---|---|---|---|
| 2007/0246275 A1* | 10/2007 | Dreibholz et al. | 180/65.2 |
| 2007/0275819 A1* | 11/2007 | Hirata | 477/5 |
| 2008/0016599 A1* | 1/2008 | Dreibholz et al. | 903/940 |
| 2008/0071437 A1* | 3/2008 | Hirata et al. | 701/22 |
| 2008/0227589 A1 | 9/2008 | Zillmer et al. | |

FOREIGN PATENT DOCUMENTS

| | | |
|---|---|---|
| DE | 196 31 243 A1 | 2/1997 |
| DE | 10 2004 052 786 A1 | 5/2006 |

* cited by examiner

METHOD FOR OPERATING A DRIVE TRAIN OF A VEHICLE DURING TRAILING THROTTLE OPERATION

This application is a National Stage completion of PCT/EP2008/050107 filed Jan. 8, 2008, which claims priority from German patent application serial no. 10 2007 008 086.9 filed Feb. 17, 2007.

FIELD OF THE INVENTION

The invention concerns a method for operating a drivetrain of a vehicle during coating operation.

BACKGROUND OF THE INVENTION

In drivetrains of so-termed parallel hybrid vehicles known from practice, which usually comprise in each case an internal combustion engine, an electric machine and a transmission device, thrust torque to be applied to the drive outputs is provided by the electric machine and the combustion engine. During this the electric machine is operated as a generator and electrical energy is recuperated. The electric machines, among other things, are arranged in the force flow between the combustion engine and the transmission devices of the drivetrains. In addition, between the electric machines and the drive outputs of the drivetrains in each case a shift element with continuously variable transmission capacity is provided, so that the nominal output torques to be applied at the drive output depends on the transmission capacity of the shift elements.

To save fuel, depending on the operating condition the internal combustion engines are shut off during thrust operation. To do this, the still running combustion engines and the electric machines are decoupled from the drive output by the shift elements and the combustion engines are then stopped actively by the electric machines.

In this, however, it is a disadvantage that the above-described decoupling of the combustion engines and electric machines gives rise to traction force interruptions. Furthermore, the above-described mode of operation reduces the spontaneity of the drivetrain to an undesired extent, since the time span between the specification of a driver's wish calling for a change in the operating condition of the drivetrain, and the time when the operating point of a drivetrain called for by the driver's wish specification has been reached, is quite long, so that too much time is taken until the drivetrain reacts to the changed driver's wish.

Other variants of drivetrains for parallel hybrid vehicles are formed, in the area between the internal combustion engine and the electric machines, in each case with a shift element or a separator clutch, by means of which the combustion engines can be decoupled from the drivetrains in these areas. In drivetrains of such design, whenever the combustion engines need to be shut off, they are first decoupled by the separator clutches from the drivetrains and then stopped.

However, this procedure disadvantageously results in a decrease of the driving comfort since the stopping of a combustion engine in the vehicle, in itself, excites uncomfortable oscillations which bring about vibrations of the vehicle. These oscillations result from irregularity of the running of the combustion engines during their running-down process. Furthermore, during run-down processes no thrust torques produced by the combustion engines for generating nominal output torques at the drive output are available when the separator clutches are open, since in the decoupled condition of the combustion engines their rotation energy cannot be utilized.

SUMMARY OF THE INVENTION

Accordingly, the purpose of the present invention is to provide a method for operating a drivetrain of a vehicle during coast operation, by means of which a thrust torque of an internal combustion engine can be used almost throughout the entire shut-off process of the combustion engine, without interrupting the traction force and at the same time with good spontaneity of the drivetrain and a high level of driving comfort.

In the method according to the invention for operating a drivetrain of a vehicle during coast operation, the drivetrain comprising an internal combustion engine, an electric machine and a transmission device, with the electric machine arranged in the force flow between the combustion engine and the transmission device, a shift element with continuously variable transmission capacity is provided between the electric machine and a drive output, such that a nominal output torque to be applied at the drive output depends on the transmission capacity of the shift element, and the transmission capacity of the shift element is adjusted under control as a function of a nominal output torque called for, in such manner that the transmission capacity of the shift element provides the nominal drive output torque required. In addition, during a shut-off process of the internal combustion engine the rotation speed of the electric machine is adjusted under control so as to keep the shift element operating in slipping mode, at least during the shut-off process of the combustion engine, and to bring down the speed of the combustion engine to zero by means of the electric machine.

By virtue of the method according to the invention the internal combustion engine is stopped in a manner not perceptible by a driver of a vehicle, since irregular running during the stopping of the combustion engine, and torque fluctuations resulting therefrom, are not passed on by the slipping shift element toward the drive output. Moreover, compared to conventionally operated drivetrains, with a drivetrain operated in accordance with the invention the recuperative operation of the electric machine is not interrupted thanks to the controlled connection between the electric machine and the drive output of the vehicle, so that the electric braking torque produced by the electric machine operating as a generator is applied via the shift element to the drive output throughout the shut-off process of the combustion engine.

In addition, by virtue of the procedure according to the invention, during coasting operation of a vehicle or its drivetrain both the vehicle's energy and the rotational kinetic energy of the inertial masses of the combustion engine are used almost throughout the entire shut-off phase of the combustion engine, and at the same time the fuel consumption of the vehicle is reduced by stopping the combustion engine during thrust operation and the occurrence of frictional losses, caused by the combustion engine when it is stopped and which reduce the efficiency of the electric machine's recuperative operation, is avoided.

To improve the effectiveness of the electric machine's regulation, an advantageous variant of the method according to the invention provides that the nominal torque required at the output of the drivetrain and an actual torque produced by the combustion engine are taken into account for the anticipatory control of the speed-regulated electric machine.

In a further advantageous variant of the method according to the invention, the speed of the combustion engine is brought, preferably by gradient-like control of the speed of the electric machine, down to zero or to below a predefined limit value lower than a minimum operating speed of the combustion engine, and then to zero by interrupting the fuel combustion in the internal combustion engine.

This means that by means of the electric machine operated as a generator, the speed is changed from a running to a stopped condition virtually without any wear, and the torque or thrust provided by the combustion engine can be used at least approximately until the combustion engine has finally been shut off.

In a further variant of the method according to the invention, the speed of the electric machine is advantageously adjusted during the shut-off process of the combustion engine as a function of a deviation between a specified nominal speed of the electric machine and an actual speed thereof, in order to operate the shift element between the electric machine and the drive output in a permanently slipping condition during the shut-off process and to be able to reduce the slip of the shift element to a necessary minimum. This ensures in a simple manner that the loads on the shift element resulting from slipping operation are as small as possible.

In a further variant of the method according to the invention, the loading of the shift element can be reduced still further by bringing the slip of the shift element down toward zero after the combustion engine has been shut off, by means of the electric machine still being operated in a speed-regulated manner, so that for the anticipatory control of the speed regulation, the actual torque produced by the electric machine is taken into account when the active connection between the stopped combustion engine and the shift element is interrupted.

In a further advantageous variant of the method according to the invention, the nominal output torque to be applied at the drive output is provided by the electric machine when the shift element is in slipping operation. In an inexpensive manner this procedure enables the control and regulation complexity to be reduced and further reduces the shift element loading.

BRIEF DESCRIPTION OF THE DRAWINGS

Other advantages and advantageous further developments of the invention emerge from the claims and from the example embodiment whose principle is described with reference to the drawings, which show:

DETAILED DESCRIPTION OF THE PREFERRED EMBODIMENTS

Figure 1:
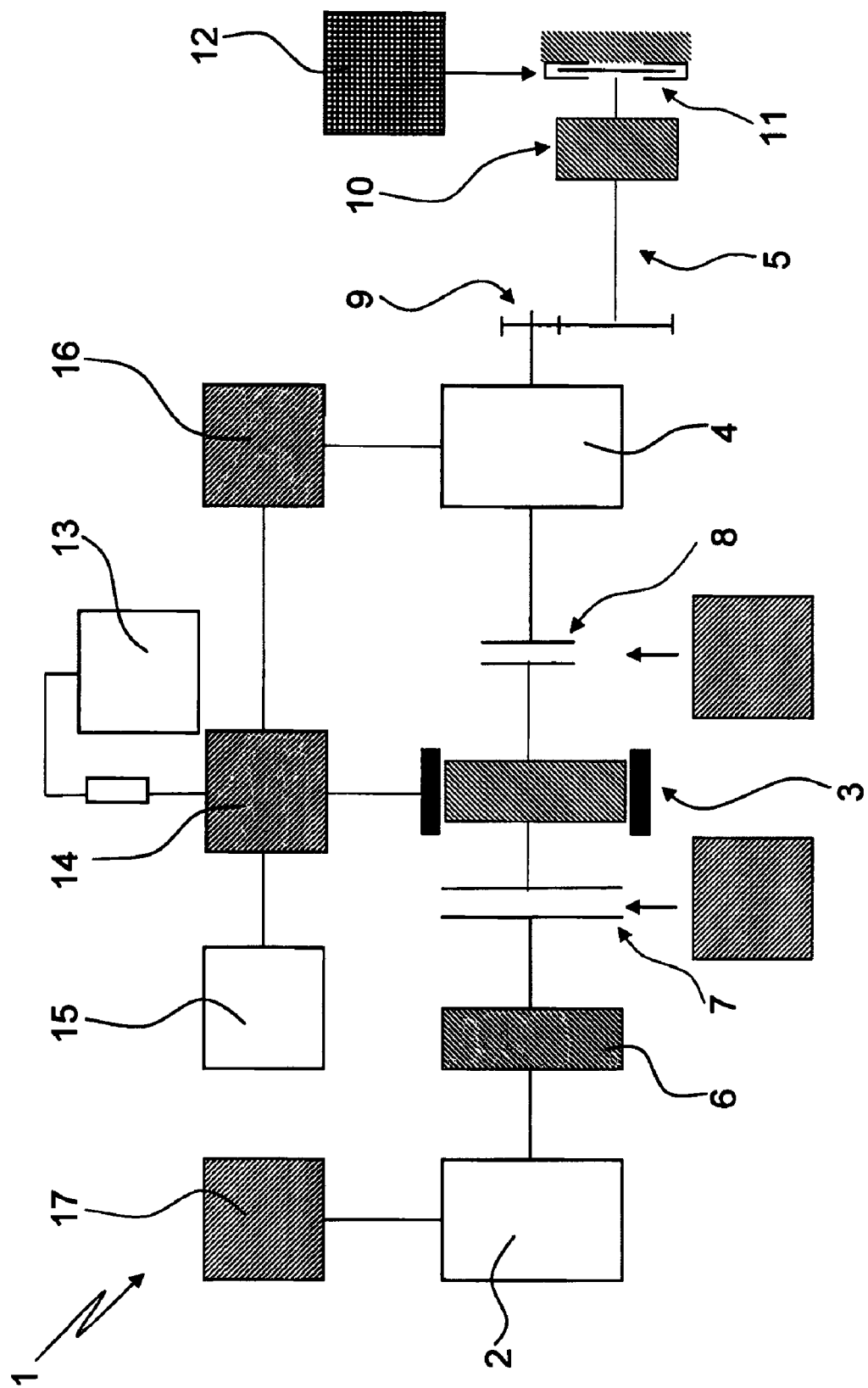
FIG. 1: Very diagrammatic representation of a drivetrain made as a parallel hybrid drivetrain.

FIG. 1 shows a drivetrain 1 of a vehicle, made as a parallel hybrid drivetrain, in the form of a block diagram. The drivetrain 1 comprises an internal combustion engine 2, an electric machine 3, a transmission device 4 and a drive output 5. Between the electric machine 3 and the transmission device 4, which is on the side of the electric machine 3 facing away from the combustion engine 2, is arranged a shift element 8 with continuously variable transmission capacity, by means of which the part of the drivetrain 1 associated with the electric machine can be brought into active connection with the part of the drivetrain associated with the transmission device 4 and the drive output 5.

In this context the transmission device 4 is made as a conventional automatic transmission by which various gear ratios can be engaged. The transmission device 4 can be any transmission known from practice, which can have either an integrated starting clutch or be combined with a separate starting element, such as a friction clutch, which is not used for engaging gear ratios in the automatic transmission.

In the present case the shift element 8 is arranged outside the transmission device 4 or, in other example embodiments of the drivetrain 1 not illustrated in the drawing, it can also be arranged inside the transmission device and can also be made as a shift element of the transmission device by means of which at least one gear ratio of the transmission device 4 can be engaged.

On the side of the transmission device 4 facing away from the shift element 8, i.e. the output side of the transmission device, the transmission device 4 is actively connected, via an axle differential 9, to the wheels 10 of a vehicle drive axle of the drivetrain 1. In the area of the wheels 10 part of a brake unit 11 is shown, which is made with a so-termed brake booster 12. The brake booster 12 is a device by means of which, during coating operation of the drivetrain 1, the brake unit is automatically actuated to produce an opposing thrust torque on the drive output 5 when an electric accumulator 13 associated with the electric machine 3 has been fully charged and when the motor braking torque that can be produced at the drive output 5 by the electric machine 3 is not sufficient. The electric accumulator 13 is connected, via an electric control unit 14, to the electric machine 3, an on-board electrical power supply system 15 and an electric transmission control unit 16, the latter provided for the control of the transmission device 4. An engine control unit 17 is provided for controlling the internal combustion engine 2.

Between the combustion engine 2 and the electric machine 3 are arranged a device 6 for damping running irregularities, and a further frictional shift element 7. As a function of transmission capacity of the further shift element 7 an active connection can be made between the combustion engine 2 and the electric machine 3, in order to produce various operating conditions of the drivetrain 1 of the vehicle, such as drive power from the electric machine 3 alone, parallel drive power from the combustion engine 2 and the electric machine 3, or drive power from the combustion engine 2 alone.

Moreover, by virtue of the arrangement of the further shift element 7 between the combustion engine 2 and the electric machine 3, the combustion engine 2 can be coupled to the electric machine 3 via the further shift element 7 only when the electric machine 3 has sufficient rotational energy to start up the combustion engine 2, so that the combustion engine 2 is started by the electric machine 3.

Figure 2:
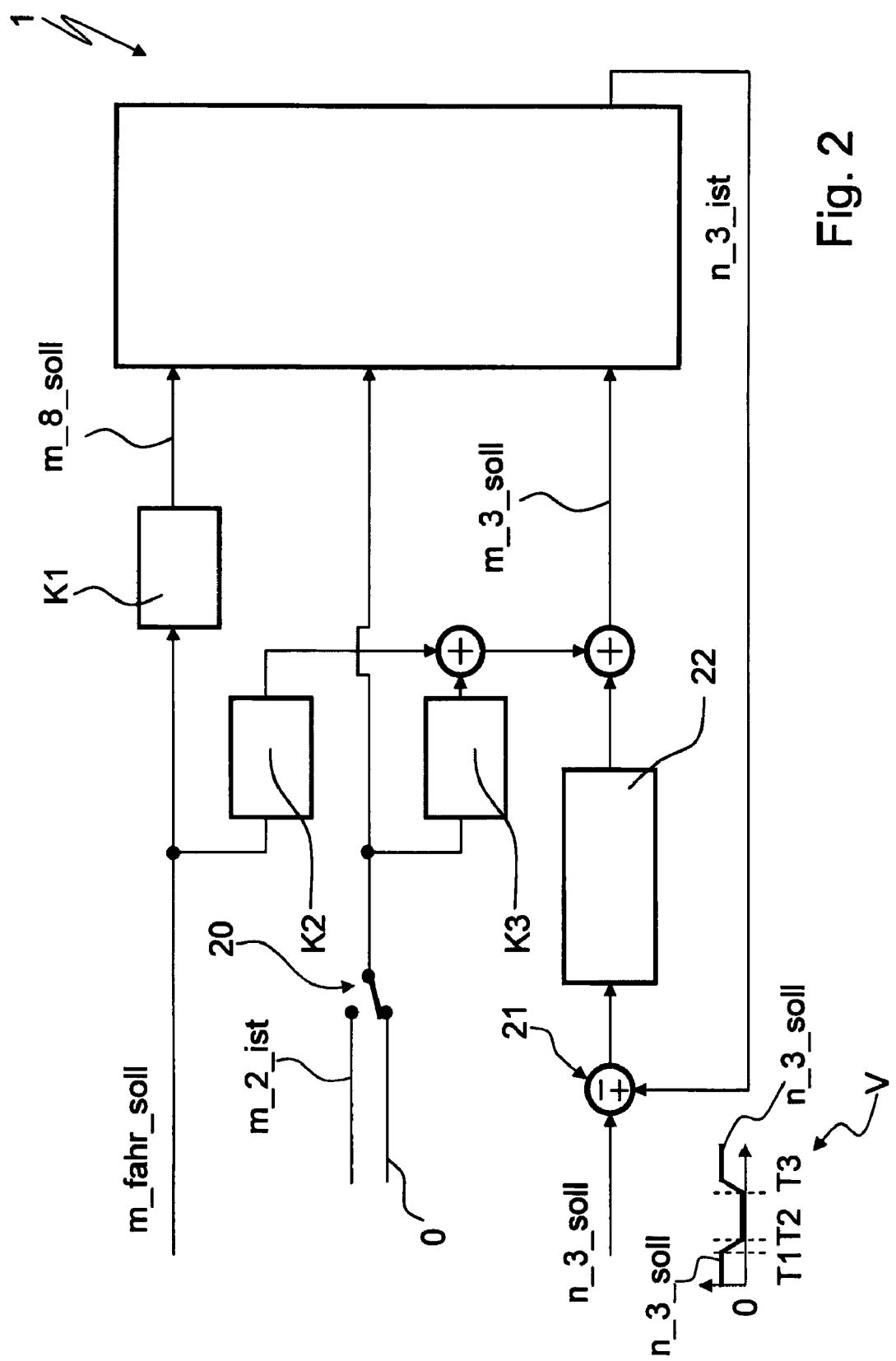
FIG. 2: Block circuit diagram of a control structure for the operation of the drivetrain in FIG. 1 during coasting operation and during a shut-off process of the internal combustion engine.

FIG. 2 shows a control structure represented in the form of a block circuit diagram, by means of which a drivetrain of a vehicle, in particular a drivetrain as shown in FIG. 1, can be operated in coasting operation during a shut-off process of the combustion engine 2 in the manner according to the invention as described in greater detail below. In this context it should be mentioned that the method according to the invention is also suitable for drivetrains made without the further shift element 7 between the combustion engine 2 and the electric machine 3. In such a drivetrain design, the electric machine 3 and the combustion engine 2 are connected permanently to one another by a solid shaft.

During coasting operation of the drivetrain 1, a nominal drive output torque m_fahr_soll, called for by a superimposed driving strategy and/or a driver's wish specification when the combustion engine 2 is running and the shift elements 7 and 8 have appropriate transmission capacities, is delivered to the drive output 5 in part by the electric machine 3 and in part by the combustion engine 2. If a shut-down of the combustion engine 2 is called for during such an operating situation of the drivetrain 1, the transmission capacity of the shift element 8 is reduced continuously in a controlled manner and the shift element 8 is changed to a slipping condition. The other shift element 7 remains fully engaged and monitoring begins, whereby an operating condition variation of the shift element 8 is followed.

When the shift element 8 has changed to slipping operation, regulation of its slip with the help of the electric machine 3 is started. The transmission capacity of the shift element 8 continues being adjusted under control so that its transmission capacity remains at the level required to deliver the nominal drive output torque $m\_fahr\_soll$ at the output 5. If the specification of the output torque required at the drive output 5, or nominal drive output torque $m\_fahr\_soll$, changes, the driver's wish or driving strategy specification in the area of the shift element 8 is implemented by changing the transmission capacity of the shift element 8.

This means that the nominal drive output torque $m\_fahr\_soll$ is a control magnitude of the control structure in FIG. 2 for the real process, or for the drivetrain 1 of FIG. 1. With reference to the nominal output torque $m\_fahr\_soll$, the torque that can be transmitted via the shift element 8 or the transmission capacity of the shift element 8 equivalent thereto is determined and used as a control magnitude $m\_8\_soll$ for the shift element 8. The nominal drive output torque $m\_fahr\_soll$ can be adapted by means of a correction control block K1 such that in the correction control block K1 administratively determined correction factors are used.

In contrast, it is also possible to use operation-condition-dependent characteristic curves for correction, with reference to which, in turn, operation-condition-dependent correction factors can be determined in order to be able to determine exactly, for the current operating condition, the torque that can actually be transmitted by the shift element 8. In addition, however, it is also possible to determine the correction factors by appropriate adaptation routines and use them for adapting or correcting the control specifications.

Another control magnitude is an actual torque $m\_2\_ist$ of the combustion engine 2 delivered by it to the drive output 5 during a coasting-mode shut-off. Furthermore, a nominal value $n\_3\_soll$ of the speed of the electric machine 3 is specified, which is compared with its actual speed $n\_3\_ist$ at a node point 21. The difference is transmitted to a control device 22 in this case made as a proportional-integral regulator, whose output constitutes a control component for the nominal specification $m\_3\_soll$ of the torque from the electric machine 3. By regulating the speed $n\_3$ of the electric machine 3, the slip condition of the shift element 8 is maintained with the help of the electric machine 3.

In addition to the control specification of the control device 22 or the nominal specification $m\_3\_soll$ of the drive torque of the electric machine 3 determined by the control device 22, in the control structure according to FIG. 2 control components of the nominal value $m\_3\_soll$ of the drive torque from the electric machine 3 are determined as a function of load torques that constitute interference variables of the regulation. Here, the nominal output torque $m\_fahr\_soll$ and the actual torque $m\_2\_ist$ produced by the operating combustion engine 2 constitute interference variables for the regulation of the speed of the electric machine 3, which can be adapted to the real system of the drivetrain 1 in an operation-condition-dependent manner by means of further correction control blocks K2 and K3 in the same way as can the nominal output torque $m\_fahr\_soll$ by the correction control block K1.

During the slip regulation of the shift element 8, the combustion engine 2 is shut down by the electric machine 3, in that the speed $n\_3$ of the electric machine 3 is brought down steadily to zero or to below a predefined limit value of the electric machine's speed which is lower than a minimum combustion engine speed. At the same time the fuel combustion in the internal combustion engine 2 is interrupted, so the speed of the combustion engine 2 falls to zero and the combustion engine 2 is in a stopped condition. Any running irregularities that occur during this last operating phase of the combustion engine 2 are not passed on in the area of the slipping shift element 8 toward the drive output 5, so oscillations in the drivetrain 1 that reduce driving comfort are avoided in a simple manner.

At the same time, the thrust torque available while the combustion engine 2 is running is delivered via the shift element 8 to the drive output 5 until the time when the combustion engine 2 has stopped. When the combustion engine 2 has stopped the other shift element 7 is disengaged and the combustion engine 2 is decoupled from the drivetrain 1, so that the rotating masses of the combustion engine 2 do not have to be driven during purely electric-machine-powered driving operation and thus, in a simple manner, friction losses which would reduce the efficiency of recuperative operation are avoided.

Then, by means of the electric machine 3 still operated under speed regulation the slip of the shift element 8 is reduced, and once the combustion engine 2 has been stopped and the other shift element 7 disengaged, in the control structure according to FIG. 2 a switch 20 is changed over and the speed regulation is carried out without the actual torque $m\_2\_ist$ of the combustion engine 2.

Again thereafter, the shift element 8 is fully engaged in order to reduce the load and the electric machine 3 is changed over to torque delivery, the torque supplied by the electric machine 3 being adjusted as a function of driver's wish indications so that the drivetrain 1 is then operating in a purely electric-powered mode.

A time variation of the nominal specification $n\_3\_soll$ of the speed of the electric machine 3 during the process according to the invention is shown in principle, in greatly simplified form, indexed V in FIG. 2. This representation shows that during the process according to the invention the nominal specification $n\_3\_soll$ changes from a first value $n\_3A$ at a time T1, when the call to shut off the combustion engine 2 has been made and when the shift element 8 is in slipping operation, steadily toward zero. From a time T2 the nominal specification $n\_3\_soll$ of the speed of the electric machine 3 remains at zero until a time T3, when the combustion engine 2 has been stopped. Then, the nominal value $n\_3\_soll$ of the speed of the electric machine 3 is increased steadily to a value $n\_3B$ at which the nominal output torque $m\_fahr\_soll$ is delivered to the drive output 5 while the shift element 8 is operating without slip, and the process according to the invention ends.

The method described above for operating a drivetrain or parallel hybrid drivetrain can basically also be used with drivetrains made in the area between the electric machine 3 and the shift element 8 with a hydrodynamic torque converter, with or without an associated converter bridging clutch, such that when the converter bridging clutch is engaged the drivetrain is operated in coasting mode during a combustion engine shut-off process in the manner described above. When the converter bridging clutch is disengaged or slipping, a smaller speed difference must be set in the area of the shift element 8, whereby less friction energy is generated in this area.

In general, with the method according to the invention an active engine stop of the combustion engine of a drivetrain can be carried out, which is supported in a simple manner by an electric machine while a thrust torque of the electric machine and the running combustion engine is transmitted to the vehicle by a slipping clutch. Slip regulation in the area of the clutch takes place by virtue of the torque supplied by the electric machine 3, while the torque that can be transmitted by the clutch is adjusted purely under control in accordance with the driver's wish and/or a superimposed driving strategy.

INDEXES

1 Drivetrain
2 Internal combustion engine
3 Electric machine
4 Transmission device
5 Drive output
6 Device for damping running irregularities
7 Further shift element
8 Shift element
9 Axle differential
10 Wheels
11 Brake unit
12 Brake booster
13 Electric accumulator
14 Electric control device
15 On-board electric power supply system
16 Electric transmission control device
17 Engine control unit
20 Switch
21 Node point
22 Regulating device
K1 to K3 Correction control blocks
$m\_2$ Internal combustion engine torque
$m\_8$ Transmission capacity of the shift element
$m\_fahr\_soll$ Nominal drive output torque
$n\_3$ Speed of the electric machine

The invention claimed is:

1. A method of operating a drivetrain (1) of a vehicle during thrust operation, the drivetrain comprising an internal combustion engine (2), an electric machine (3) and a transmission device (4), the electric machine (3) being located in a force flow between the combustion engine (2) and the transmission device (4) and a shift element (8), with a continuously variable transmission capacity, being located between the electric machine (3) and a drive output (5) such that a nominal output torque ($m\_fahr\_soll$) delivered to the drive output (5) is a function of the transmission capacity of the shift element (8), the method comprising the steps of:
adjusting the transmission capacity of the shift element (8), in a controlled manner as a function of the nominal output torque ($m\_fahr\_soll$), such that the transmission capacity of the shift element (8) is as required for delivering the nominal output torque ($m\_fahr\_soll$) to the drive output (5);
adjusting a speed ($n\_3$) of the electric machine (3), in a controlled manner during a shut-off process of the combustion engine (2), to maintain the shift element (8) in a slipping operation at least during the process of shutting off the combustion engine (2); and
reducing a speed of the combustion engine (2) to zero, via the electric machine (3).

2. The method according to claim 1, further comprising the step of considering the nominal output torque ($m\_fahr\_soll$) and an actual torque ($m\_2\_ist$), produced by the combustion engine (2), for anticipatory control of the speed-regulated electric machine (3).

3. The method according to claim 2, further comprising the step of reducing the speed of the combustion engine (2) to zero by reducing the speed of the electric machine (3) to either zero or below a predefined limit value lower than a minimum running speed of the combustion engine (2), and interrupting fuel combustion in the combustion engine (2).

4. The method according to claim 1, further comprising the step of adjusting the speed of the electric machine (3), during the shut-off process of the combustion engine (2), as a function of a difference between a nominal value ($n\_3\_soll$) of the speed of the electric machine (3) and an actual value ($n\_3\_ist$) of the of the speed of the electric machine (3).

5. The method according to claim 1, further comprising the step of reducing the transmission capacity of the shift element (8) continuously, in a controlled manner, and adjusting the shift element (8) to a slipping condition when shutting off of the combustion engine (2) is requested.

6. The method according to claim 5, further comprising the steps of
adjusting the slip of the shift element (8) under control by the electric machine (3) while the transmission capacity of the shift element (8) is adjusted under control so as to bring the transmission capacity of the shift element (8) to a value required to deliver the nominal output torque ($m\_fahr\_soll$) to the drive output (5); and
implementing a driver's wish or a driving strategy specification in the area of the shift element (8) by changing the transmission capacity of the shift element (8), if the specification of the output torque ($m\_fahr\_soll$) to be delivered to the drive output (5) changes in accordance with either the driver's wish or the driving strategy.

7. The method according to claim 1, further comprising the step of reducing the slip of the shift element (8) toward zero with the electric machine (3), which is still operating under a speed regulation, when the combustion engine (2) is stopped and considering the nominal output torque ($m\_fahr\_soll$) for the anticipatory control of the speed regulation, when an active connection between the stopped combustion engine and the shift element is interrupted.

8. The method according to claim 1, further comprising the step of delivering the nominal output torque ($m\_fahr\_soll$) with the electric machine (3) when the shift element (8) is operating without slip and the combustion engine (2) is stopped.

9. The method according to claim 1, further comprising the step of operating a shift element (7), which is located in the power train between the combustion engine (2) and the electric machine (3), without slip when the combustion engine (2) is running.

10. The method according to claim 9, further comprising the steps of
controlling the electric machine (3) as a function of the nominal output torque ($m\_fahr\_soll$) and a deviation between the nominal value ($n\_3\_soll$) and an actual value ($n\_3\_ist$) of the speed of the electric machine (3), when the combustion engine (2) is shut off and the shift element (7), which is located between the combustion engine (2) and the electric machine (3), is disengaged.

11. The method according to claim 3, further comprising the step of reducing the speed of the combustion engine (2) to zero by reducing the speed of the electric machine (3) by a steady gradient.

* * * * *